May 16, 1967     J. ROSÁN ETAL     3,319,690
TOP DRIVEN LOCKING INSERT
Filed Jan. 2, 1964
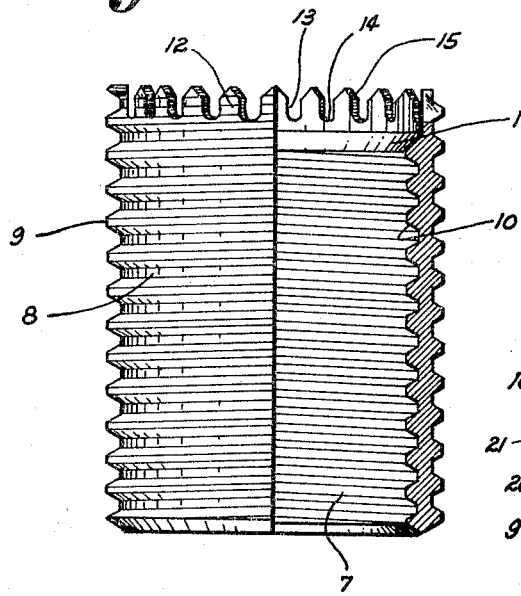
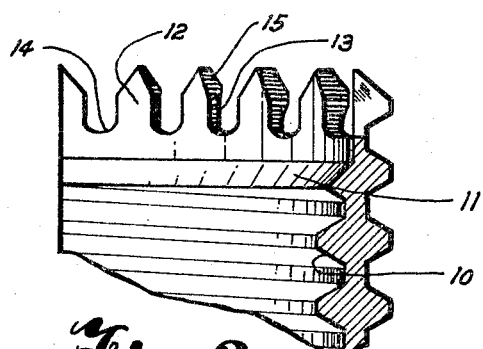
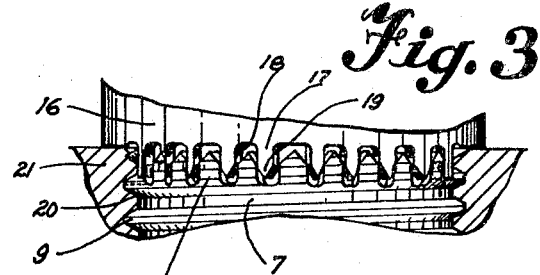
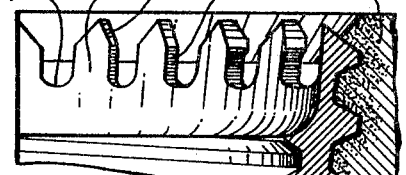
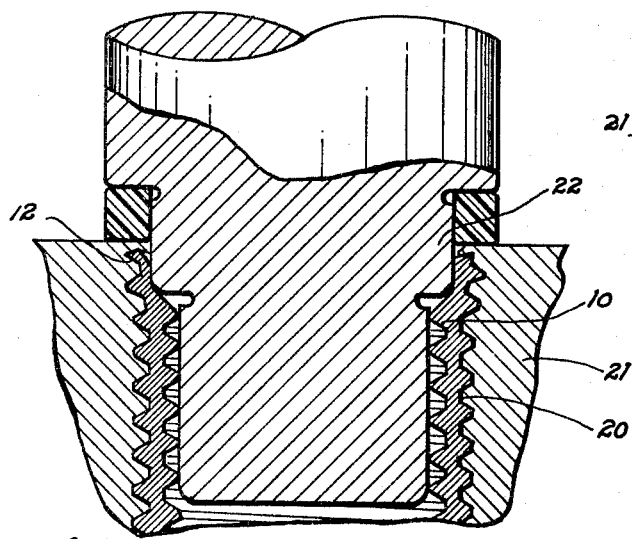
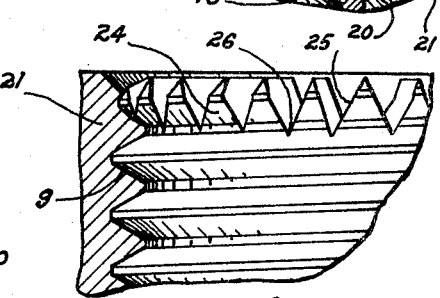
INVENTOR.
*José Rosán*
BY *Milan Novakovich*
*Roman A. ......*
ATTORNEY

United States Patent Office 3,319,690
Patented May 16, 1967

3,319,690
TOP DRIVEN LOCKING INSERT
José Rosán, San Juan Capistrano, and Milan Novakovich, Balboa Island, Calif., assignors to Rosan Engineering Corp., Newport Beach, Calif., a corporation of California
Filed Jan. 2, 1964, Ser. No. 335,072
6 Claims. (Cl. 151—41.73)

This invention relates generally to improvements in inserts having external threads for mounting the same in a workpiece and having a threaded bore to receive a fastener, and to a method of using same.

More particularly the invention concerns one-piece inserts designed to be anchored in bores of relatively soft material and to the method of using such inserts. The invention finds particular usefulness when the fastener is subject to constant vibration and assurance must be provided that the insert received in the fastener will not loosen or fail either by axial or rotational displacement. The invention is also useful where there is insufficient room to allow installation of a part by tools which require lateral movement.

The present insert significantly differs from all prior inserts in that both the anti-rotational locking means and the driving means are provided by the same elements of the insert. That is, the driving means which consists of coaxial grooves or serrations at one end of the insert body, and which is adapted to be engaged by a driving tool with a matching configuration, can also be laterally expanded into the workpiece material so as to provide a lock which is resistant to torque forces.

The elements which provide the driving means and the anti-rotational locking means are comprised of a plurality of longitudinally directioned serrations. These serrations may be saw-tooth in shape, or have parallel walls with a saw-tooth configuration on the ends thereof, or may have a square or oblong configuration. An associated driving tool which is adapted to engage the serrations can be rotated to install the insert in a tapped hole by exerting an outward radial force upon the serrated portion of the insert, so as to embed the serrations into the walls of a tapped bore, thereby providing a lock capable of resisting high torque loads.

Another important feature of the invention is that it can be installed in a bore in a workpiece which does not have a counterbore. This consequently allows the preparation of a hole with ordinary tools such as a common drill and a common tap. Further, an insert embodying the principles of this invention can be installed to any depth and can also be installed in tandem in the same hole. The elimination of the need for a counterbore in a hole in the workpiece also allows closer "edge distance," i.e. the distance or surface which is perpendicular to the workpiece surface at which an insert can be installed in a workpiece.

A further advantage of the present invention is that additional "pull-out" resistance or axial displacement is provided, since the threads in the area of the locking means are substantially intact.

Another important feature of the present insert is that the driving and locking means can be used with inserts having a variety of wall thicknesses and with stud type inserts.

Still another feature of the present invention is that it can be utilized with inserts having internal locking means and/or self-tapping means.

Accordingly, the principal object of the invention is to provide an improved, simple, one-piece insert of inexpensive construction, capable of being driven and locked into a workpiece by the same means and capable of being installed and locked into place by extremely simple tools.

Another object is to provide an insert which can be locked against rotational force.

Still another object is to provide an insert which can be installed in a tapped hole not having a counterbore.

Still another object is to provide an insert which may be used in a bore of any depth and which may also be used in tandem in a bore.

A further object is to provide a method of using a one-piece insert having the driving means and locking means provided by the same elements of the insert.

Other objects and advantages of the invention will become apparent from the following description taken in conjunction with the accompanying drawings in which:

FIG. 1 is an enlarged, sectional, elevational view of the insert embodying the principles of the present invention;

FIG. 2 is a greatly enlarged fragmentary view of the insert of FIG. 1, showing the details of the serrations of the driving and locking means;

FIG. 3 is an enlarged, sectional, elevational view of the insert of FIG. 1, showing a driving tool in engagement therewith, subsequent to driving said insert into a hole in a workpiece;

FIG. 4 is an enlarged, sectional elevational view, showing the insert of FIG. 1, having an expanding tool in engagement therewith after expanding the locking serrations;

FIG. 5 is a greatly enlarged, fragmentary, elevational view of the serrated area of FIG. 4, showing the serrations embedded into the wall of the bore in the workpiece;

FIG. 6 is a greatly enlarged fragmentary view illustrating an alternate configuration of the combined driving and locking means having a saw-tooth structure.

Referring more particularly to FIG. 1, numeral 7 designates generally an insert constructed of any suitable material which is relatively harder than the workpiece. The insert is comprised of cylindrical body 8 and is provided with external threads 9, a threaded bore 10 and a counterbore 11.

The insert body 8 has longitudinally extending serrations 12 which, as illustrated, have substantially parallel sides 13, root cavities 14 and a saw-tooth configuration 15 at the ends of said serrations and are constructed so as provide a combined driving and locking means.

The serrations 12 described in FIG. 1 are illustrated in FIG. 2, but are greatly enlarged to better show the detail of the combined driving and locking serrations. These serrations may be engaged by a driving tool which is adapted to be accommodated by the said serrations (see FIG. 3).

In FIG. 3, the insert 7 is shown threaded into workpiece 21 and illustrates the driving serrations 12 thereof engaged by a tool 16 which is provided with longitudinally extending serrations 17, having substantially parallel side walls 18 and saw-tooth configurations 19 at the ends thereof which are adapted to engage said serrations 12 of insert 7. By rotating tool 16, insert 7 is screwed into threaded bore 20 of workpiece 21. After the insert is fully driven, the tool may be easily disengaged therefrom.

In FIG. 4, insert 7 is shown fully installed in a threaded bore 20 of workpiece 21. It should be noted that bore 20 in workpiece 21 is not provided with a counterbore and thus may be prepared by simply drilling a hole and tapping same. In FIG. 4, expanding tool 22 is shown engaged with insert 7 after having radially expanded the locking serrations 12 into threaded bore 20 of the workpiece 21. The embedding of the insert serrations 12 into the bore 20 of workpiece 21 displaces the material of said workpiece into the root cavities 14 of said serrations. The material of the workpiece which is displaced by the serrations 12 is caused to flow into root cavities 14 and is "cold-worked" and consequently hardened, thereby providing additional resistance to torque forces.

FIG. 5 shows a greatly enlarged fragmentary view of the locking serrations 12 of insert 7 embedded into the internal walls of threaded bore 20 of workpiece 21 by the expanding tool 22 shown in FIG. 4. Stippled area 23 shows the area of "cold-work" taken on a sectional elevational view of the locking serrations 12 of insert 7.

FIG. 6 illustrates an alternate configuration of the combined driving and locking means comprised of serrations 24 having a saw-tooth structure provided with inclined walls 25 and root cavities 26 prior to radially expanding said serrations into workpiece 21.

While several embodiments of the invention and the method of using same have been described, it is, of course, understood that the particular embodiments of the invention herein disclosed are for illustrative purposes only and that various changes may be made therein, without departing from the principles of the invention or the scope of the annexed claims.

We claim:
1. In a one-piece insert adapted to be installed in a bore in a workpiece, the combination of:
    an internally threaded cylindrical body having a counterbore at one end thereof;
    combined driving and outwardly expandable locking means provided at the counterbored end of said body, said combined driving and locking means being comprised of a plurality of axially extending serrations spaced around the circumference of said counterbored end, said serrations being of uniform axial extent, said combined driving and locking means being engageable by a matching tool so as to rotate said body into a bore and subsequently outwardly expand said locking means so as to embed the same into the workpiece material, thereby providing a torque-resistant lock by coaction with the material of said workpiece;
    recesses extending radially through the entire radial thickness of said counterbored end to form essentially radially extending faces on said serrations, said recesses being of the same axial extent as said serrations; and
    external threads carried by said body, said external threads continuing to the location of said serrations and forming thread segments on the exterior of the serrations interrupted by said recesses.

2. An insert as described in claim 1, wherein said serrations have a saw-tooth structure.

3. An insert as described in claim 1, wherein said serrations are formed with substantially parallel sides and have a saw-tooth configuration at the ends thereof.

4. In combination, a workpiece having a threaded bore; and a fastener, comprising:
    a cylindrical body having internal threads, and provided with a counterbore at one end thereof;
    a plurality of circumferentially spaced serrations provided by said body at one end thereof, said serrations being separated by recesses extending radially through the entire radial thickness of said counterbored end to form essentially radially extending faces on said serrations, said serrations and recesses having substantially the same radial extent, said serrations being initially axially extending and engaged by a matching driving and locking tool, said serrations being radially expanded and embedded in the threads of the bore in the workpiece;
    external threads carried by said body, said external threads continuing to the location of said serrations and forming thread segments on the exterior of the serrations interrupted by said recesses, said external threads being engaged with the threads of said workpiece bore.

5. The combination as described in claim 4, wherein said serrations have a saw-tooth structure.

6. The combination as described in claim 4, wherein said serrations have substantially parallel walls and a saw-tooth configuration at the ends thereof.

References Cited by the Examiner

UNITED STATES PATENTS

| | | | |
|---|---|---|---|
| 2,370,327 | 2/1945 | Rosan | 151—41.73 |
| 2,406,157 | 8/1946 | Nelson | 85—45 |
| 2,577,810 | 12/1951 | Rosan | 151—41.73 |
| 2,958,127 | 11/1960 | Johnson | 29—523 |
| 3,081,808 | 3/1963 | Rosan et al. | 151—41.73 |
| 3,113,377 | 12/1963 | Oakes | 29—523 |
| 3,193,857 | 7/1965 | Kahn | 151—41.73 |
| 3,220,454 | 11/1965 | Neuschotz | 151—41.72 |
| 3,230,994 | 1/1966 | Rosan | 151—41.73 |

FOREIGN PATENTS

| | | |
|---|---|---|
| 30,022 | 12/1910 | Great Britain. |
| 665,765 | 1/1952 | Great Britain. |

CARL W. TOMLIN, *Primary Examiner.*

EDWARD C. ALLEN, *Examiner.*

MARION PARSONS, JR., *Assistant Examiner.*